United States Patent Office 2,995,963
Patented Aug. 15, 1961

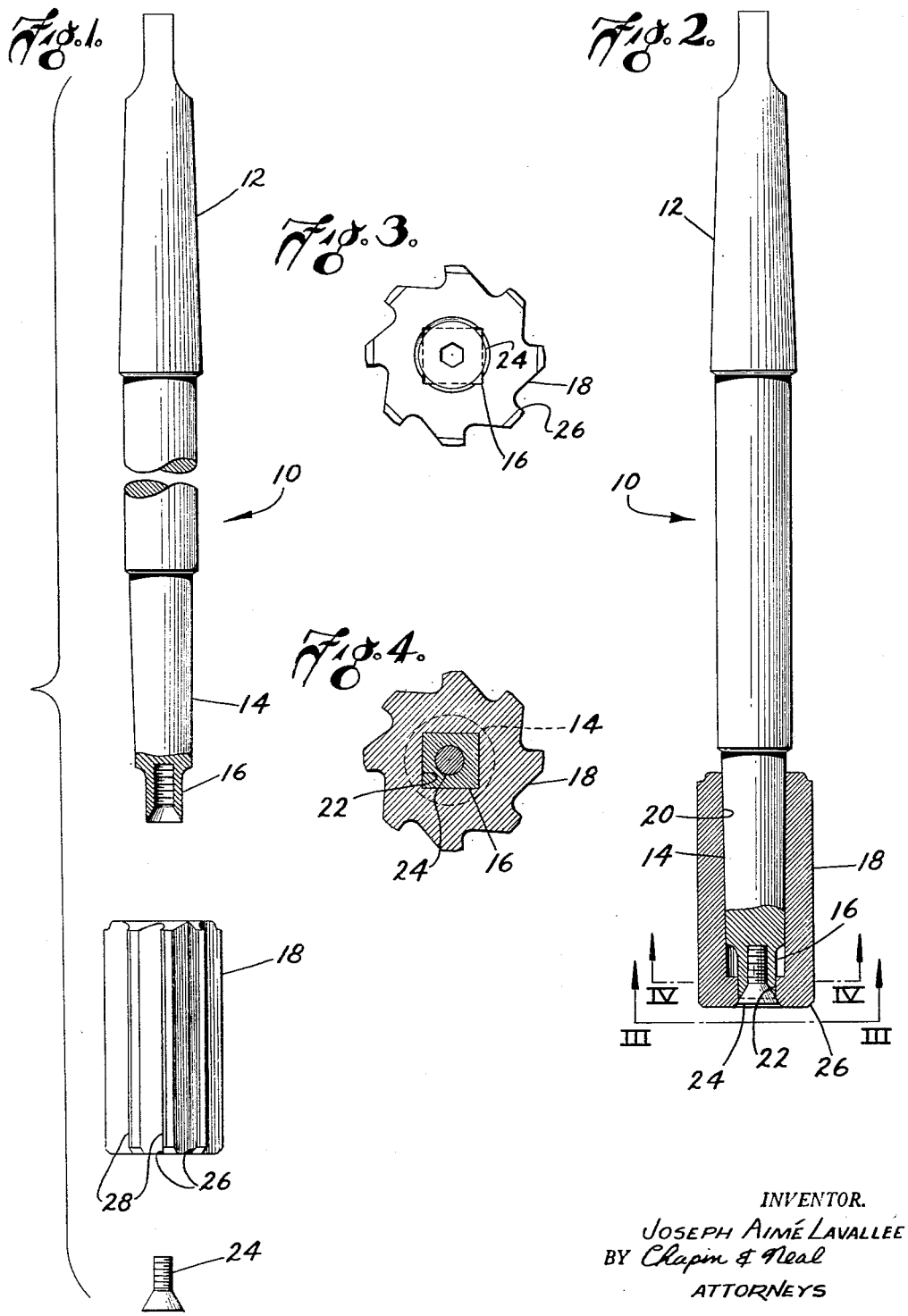

2,995,963
SHELL REAMERS
Joseph Aimé Lavallée, Springfield, Mass., assignor to Lavallee & Ide, Inc., Chicopee, Mass., a corporation of New York
Filed Mar. 31, 1960, Ser. No. 18,929
2 Claims. (Cl. 77—72)

The present invention relates broadly to the art of reamer manufacture and more specifically to an improved reamer of the so-called "shell" type.

Shell reamers are basically quite old and comprise a shank having a mandrel portion at its outer end, with replaceable, tubular cutter being mounted on this mandrel portion. The advantages of this arrangement include the ability to use a wide range of various diameter cutters on a single shank. The cutters are made of relatively expensive material such as high speed steel, while the shank is made of a less expensive steel. The cost of the individual cutters is, of course, less than the cost of a comparable one-piece reamer made of high speed steel. Another advantage which is not inconsequential is in the saving which results from the storage and inventorying of the relatively small cutters.

Shell reamers have had a fairly widespread acceptance in sizes above ½ inch, but have been limited to relatively easy to cut metals. It would be pointed out that toughness, as well as hardness is a factor in determining whether metal is easy to cut. Thus for example an ordinary 18-8 stainless steel is not particularly hard, as measured by a "Brinell" type test, but nonetheless presents machining difficulties particularly in obtaining acceptable reamed holes. With the ever increasing use of tougher materials, particularly for military use, the limitations of shell reamers have become even more apparent.

Accordingly the object of the invention is to provide an improved shell reamer construction capable of accurately reaming holes in tougher materials than has hitherto been possible or practical.

The reamer construction of the present invention is characterized by a complete absence of chatter or vibration even when reaming holes in very hard or tough metals. This absence of chatter results in the reamed hole having an extremely smooth finish and an accurate diameter. Structurally the present reamer comprises a shank having a tapered mandrel portion at its outer end with a correspondingly tapered cutter telescoped over the mandrel portion. The characterizing features of this reamer construction are found in a non-circular key portion at the outer end of the mandrel portion which is received by an opening of corresponding shape in the outer end of the cutter. The key portion extends substantially to a point radially aligned with cutting edges formed at the outer end of the cutter. Preferably, a screw is threaded into the outer end of the shank on its axis, to retain the cutter in place.

The above and other related objects and features of the invention will be apparent from a reading of the following description of the disclosure found in the accompanying drawing and the novelty thereof pointed out in the appended claims.

In the drawing:

FIG. 1 is an exploded view, with portions thereof in section and other portions broken away, of a shell reamer embodying this invention;

FIG. 2 is a view partially in section of this reamer assembled for use;

FIG. 3 is a view, on an enlarged scale, of the outer end of the reamer as seen on line III—III in FIG. 2 and FIG. 4, also on an enlarged scale, is a section taken on line IV—IV in FIG. 2.

The reamer seen in the drawing comprises a shank 10 having a tapered portion 12 at its inner end which is adapted to be received by the chuck of a drill press, lathe or the like which is to be used in reaming holes in a particular workpiece. The portion 12 could, of course, be a straight cylindrical portion where a jaw type chuck is to be used.

The outer end of the reamer is concentric with the inner end and is also tapered at what is referred to as a mandrel portion 14. It has been found preferable to use a very low taper on the portion 14, in the order of ⅛ inch per foot. The extreme outer end or terminal portion 16 of the shank 10 is non-circular or square in cross section and referred to as the key portion.

A cutter 18 has a tapered bore 20 corresponding to the taper on the mandrel portion 14. At the outer end of the mandrel there is a non-circular square opening or hole 22 which is adapted to receive the extreme end portion 16 of the shank 10.

In use the cutter 18 is telescoped over the mandrel portion 14 (FIG. 2) and held in place by a flat head machine screw 24. The screw 24 is threaded into the outer end face of the shank 10 on the axis thereof. The outer end of the square hole 22 is countersunk so that the screw 24 will not project beyond the outer end face of the cutter 18.

The shank 10 is formed of a low to medium carbon steel which is relatively inexpensive, while the cutter 18 is formed of a high speed steel which is relatively expensive. This in itself represents a very substantial saving as compared to the cost of a comparable reamer integrally formed from a single length of high speed steel.

The cutter 10 is interchangeable with other cutters of different diameter so that a single shank 10 can be used in reaming a wide range of sizes. In fact 6 or 8 shanks can be used for the whole range of reamer sizes from ½ inch to two inches. This fact, of course, greatly reduces the storage space required since the cutters 10 are relatively small.

In use, the inner end 12 of the reamer, as seen in FIG. 2, is inserted into a driven chuck as in a drill press. The rotating reamer is then advanced into a hole and a small amount of metal removed primarily by the beveled cutting edges 26 at the outer ends of the flutes 28. The flutes 28 are of course formed concentrically of the tapered bore 20 so that they will be rotated concentrically of the axis of the shank 10. While the cutter 18 is shown with straight flutes 28 this is not essential to the present invention nor is the geometry of the cutting edges which can be designed to meet the cutting requirements of any particular metal.

The important point to be noted is the solid metal-to-metal abutting contact between the shank 10 and cutter 18 which is provided by the square key portion 16 and the square hole 22 receiving said key section. This abutting contact between the key portion of the cutter need not be spaced axially inwardly of the cutting edges more than a small fraction of an inch, if that much, by reason of the key portion at the outer terminus of the shank and the square hole which receives it in the outer end of the cutter 10. As has been pointed out, the edges 26 receive substantially all of the stress imposed on the reamer in a reaming operation. This stress is transmitted to the reamer shank with little or no torsional stress being imposed on the tubular cutter 18. By eliminating torsional strain or deflection in this fashion, vibration is minimized, if not eliminated, so that holes may be smoothly and accurately reamed in tougher materials than has been hitherto possible with conventional shell reamers.

Having thus described the invention what is claimed as novel and desired to be secured by Letters Patent of the United States is:

1. A shell reamer comprising a shank, the inner end of which is adapted to be gripped by a chuck or like driving member, said shank having a tapered mandrel portion formed at its outer end concentrically of its inner end, the taper of said mandrel portion being in the order of ⅛ inch per foot, said shank terminating outwardly of said mandrel portion in a key portion of polygonal cross section, in combination with a replaceable tubular cutter having a tapered bore matching the taper of the mandrel portion and seated thereon, said cutter having flutes formed concentrically of said bore and extending lengthwise along its outer surface, said flutes terminating at the outer end of the cutter in inwardly extending cutting edges, said cutter having a polygonal opening in its outer end of a cross section corresponding to that of the key portion of the shank, said key portion of the shank extending into said non-circular opening a distance sufficient to bring the outer end of the key portion into substantial radial alignment with the said cutting edges of the cutter, and a flat head screw axially threaded into the outer end of said shank, the outer end of said cutter being countersunk to provide a seat for the head of said screw with the outer face of said screw head substantially flush with the outer end of said cutter.

2. A shell reamer comprising a shank, the inner end of which is adapted to be gripped by a chuck or like driving member, said shank having a tapered mandrel portion formed at its outer end concentrically of its inner end, said shank terminating outwardly of said mandrel portion in a key portion of non-circular cross section, in combination with a replaceable tubular cutter having a tapered bore matching the taper of the mandrel portion and seated thereon, said cutter having flutes formed concentrically of said bore and extending lengthwise along its outer surface, said flutes terminating at the outer end of the cutter in inwardly extending cutting edges, said cutter having an opening in its outer end of a cross section corresponding to that of the key portion of the shank, said key portion of the shank extending into said non-circular opening.

References Cited in the file of this patent
UNITED STATES PATENTS

| | | |
|---|---|---|
| 906,656 | Peck | Dec. 15, 1908 |
| 2,936,659 | Garberding | May 17, 1960 |